United States Patent [19]

Meyer

[11] 4,318,020

[45] Mar. 2, 1982

[54] WINDING OF AN ELECTRIC MACHINE

[75] Inventor: Hartmut Meyer, Berlin, Fed. Rep. of Germany

[73] Assignee: Siemens Aktiengesellschaft, Munich, Fed. Rep. of Germany

[21] Appl. No.: 82,169

[22] Filed: Oct. 5, 1979

Related U.S. Application Data

[63] Continuation of Ser. No. 852,192, Nov. 17, 1977, abandoned.

[30] Foreign Application Priority Data

Dec. 6, 1976 [DE] Fed. Rep. of Germany ....... 2655609

[51] Int. Cl.³ .............................................. H02K 3/34
[52] U.S. Cl. .................................... 310/215; 310/45; 310/194; 336/84 C
[58] Field of Search ............... 310/215, 196, 201, 208, 310/214, 45, 194, 51; 336/84 C; 174/73 SC, 127

[56] References Cited

U.S. PATENT DOCUMENTS

| | | | |
|---|---|---|---|
| 2,613,238 | 10/1952 | Wieseman | 336/84 C |
| 2,705,292 | 3/1955 | Wagenseil | 310/196 |
| 2,788,456 | 4/1957 | Fromm | 310/196 |
| 3,508,096 | 4/1970 | Kull | 310/196 |
| 3,723,797 | 3/1973 | Andersson | 310/196 |
| 3,891,880 | 6/1975 | Britsch | 310/196 |
| 4,001,616 | 1/1977 | Lonseth | 310/45 |
| 4,008,409 | 4/1977 | Rhudy | 310/45 |

Primary Examiner—R. Skudy
Attorney, Agent, or Firm—Kenyon & Kenyon

[57] ABSTRACT

An improved electric machine wherein the machine comprises a slot for receiving a winding formed from a winding bar having an outer glow-discharge protection and wherein the improvement comprises a wrapping in the form of a strip of conductive material arranged in surrounding relationship to the bar so that the edge portions of the strip are situated adjacent a corner of the narrow side of the bar which faces the slot bottom. The improvement further includes cementing the edge portion of the strip lying beneath such narrow side to such side and a shim disposed adjacent the side of said bar along which the other edge portion resides.

3 Claims, 1 Drawing Figure

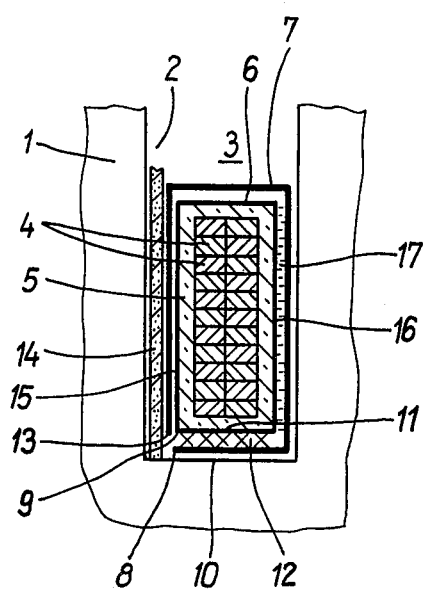

WINDING OF AN ELECTRIC MACHINE

This is a continuation of application Ser. No. 852,192 filed Nov. 17, 1977, now abandoned.

BACKGROUND OF THE INVENTION

1. Field of the Invention

This invention relates to an electric machine which includes slots each of which receives an individual winding bar provided with an outer glow-discharge protection and electrically conductive slot linings and electrically conductive shims which are inserted beside the winding bar for securing same in the slot.

2. Description of the Prior Art

Electric machines of the above type are described in the book "Die Isolierung grosser elektrischer Maschinen"—The Insulation of Large Electric Machines—by Hartmut Meyer, Springer-Verlag, 1962, on page 86. In such machines, care must be taken to ensure that the outer glow-discharge protection of the winding bar, which protection comprises coatings of conductive varnish in the region of the bar within the slot and semiconducting silicon carbide coating in the region thereof outside the slot, is neither damaged during the installation of the winding nor in the operation of the machine, as thereby the functioning of the outer glow-discharge protection would be jeopardized.

It is, therefore, an object of the present invention to provide an improved electric machine of the above type wherein the design of the slot lining and arrangement of the shims is such as to substantially avoid any damage to the outer glow-discharge protection of the winding bar during the installation of same and the operation of the machine.

SUMMARY OF THE INVENTION

In accordance with the principles of the present invention the above and other objectives are accomplished in a machine of the above type by forming the slot lining as a wrapping having the form of a strip of material arranged in surrounding relationship to the winding bar. In particular, the strip has edge portions which lie adjacent a corner of the bar which borders a narrow side thereof facing the slot bottom and a further portion extending between the edge portions whose width corresponds to the extent of the circumference of the bar and whose length corresponds to the length of the slot. The machine is further provided with cement means for cementing the edge portion of the strip lying below the aforesaid narrow side of the bar to such side and with a shim arranged on the side of the bar which is adjacent the other edge portion of the strip.

With the machine so configured, the winding bar and, thus, the coating serving as its outer glow-discharge protection, are surrounded entirely by a wrapping and are hence protected thereby. If applied appropriately early, this protective wrapping provides effective protection not only after insertion of the winding bar into the slot, but also during the storage and shipping of the winding bar prior to its installation.

Since the winding bar, when surrounded by the wrapping, is still undersized with respect to the stator slot, to allow for the thickness of the shim that is to be later inserted in the slot, the bar can be installed in the slot relatively easily. Such installation is further simplified by the orientation of the winding bar such that the narrow side cemented to the one edge portion of the wrapping faces the bottom of the slot. This permits the shim to be inserted or driven-in only on that side of the bar which resides adjacent the free other edge portion of the wrapping. As a result, the latter edge portion is now pulled with certainty in the direction of its desired position (i.e., downward so its edge faces the slot bottom). Thus, neither the wrapping nor the outer glow-discharge protection is damaged during installation, and the winding bar is firmly anchored in the slot by the driven-in shim. The latter anchoring, in turn, prevents vibration of occurring the winding bar during the operation of the machine from affecting the outer glow-discharge protection, thereby preventing damage of same.

For securing the winding bar axially, it is advisable to arrange conductive cement between the wrapping and the side wall of the bar opposite the wall located adjacent to the shim. Preferably, the cement should be applied to the subsections of the winding bar.

BRIEF DESCRIPTION OF THE DRAWING

The above and other features and aspects of the present invention will become apparent upon reading the following detailed description in conjunction with the accompanying drawing, in which, the sole FIGURE shows the cross section of a slot of an electric machine in accordance with the principles of the present invention.

DETAILED DESCRIPTION

The drawing shows a slot 2 in the stator lamination stack 1 of an electric machine with large output rating, e.g., a hydraulic generator, designed in accordance with the principles of the present invention. Situated in the slot 2 is the winding of the stator which includes a winding bar 3 formed of rectangularly arranged subconductors 4 which are insulated from each other and are enclosed overall in a high-voltage-resistant outer insulation 5. On the outer surface of the winding bar 3, an electrically conducting outer glow-discharge protection 6 is situated in the area of the slot 2, the latter protection being in the form of a varnish coating.

The winding bar 3 and its glow-discharge protection are further surrounded by an electrically conductive wrapping 7 formed by a strip of conductive material such as, for example, graphite paper or conducting polyester fabric, whose width corresponds to the circumference of the winding bar and whose length to the length of the slot. The wrapping 7 is fastened to the winding bar 3 by a conductive adhesive 12 which is applied so as to cement the edge portion 8 of the wrapping 7, which edge portion lies adjacent the end or corner 9 of the narrow side 11 of the bar facing the bottom 10 of the slot, to such narrow side. The strip forming the wrapping 7 is then wrapped around the winding bar 3 in such a manner that its other free edge portion 13 comes to lie again adjacent the corner 9 of the winding bar 3. The wrapping 7 thus totally encloses the winding bar 3 and thereby completely protects the outer glow-discharge protection 6.

The wrapping 7 can be placed around the winding bar 3 as soon as possible after the outer glow-discharge protection 6 is applied thereto during the fabrication process. This ensures that the protection afforded by the wrapping is present during the storage of the winding bar before it is installed in the slots 2.

The free edge portion 13 of the conductive wrapping 7, which is firmly pulled around the winding bar 3, is advantageously connected to the other edge portion 8 of the wrapping. This is accomplished by using individual, thin, self-sticking foil strips (not shown) to attach the edge portions.

In order to substantially avoid any air gap between the winding bar 3 and the walls of the slot 2, a strip-shaped shim 14 of a hard, conductive material such as, for example, a conductive fiberglass-resin mat, is driven by blows and/or pressure into the slot on the side 13 of the winding bar 3 which is adjacent the free edge portion 13 of the wrapping 7. This firmly secures the winding bar 3 in the slot 2 and prevents vibration of the winding bar 3 during the operation of the machine. It also prevents the ventilation slots of the stator lamination stack 1 located on the side 15 of the bar 3 from engaging the bar. The outer glow-discharge protection 6 and the wrapping 7 are not damaged when the shim 14 is driven in, but the wrapping is rather pulled into its desired position by the shim 14. The edge portion 13 of the wrapping 7 thus comes to lie at the corner 9 of the winding bar 3 with certainty.

Securing of the winding bar 3 in the axial direction can be further improved by arranging conductive cement 17 on the side wall 16 which lies opposite the side wall 15 of the winding bar, between the latter and the wrapping 7. This cement need not be applied along the entire length of the winding bar, but may be applied, preferably, to the winding bar subsections only.

What is claimed is:

1. In an electric machine having a slot for receiving a winding, an insulated winding bar in said slot and having an outer glow discharge protection layer, an electrically conductive lining means between the winding bar and the slot, and an electrically conductive shim for securing the bar in the slot, the winding bar having a narrow side facing the bottom of the slot, the improvement comprising:

the lining means including a protective strip of conductive material placed on the glow discharge protection layer, the width of the strip being substantially equal to the circumference of the winding bar and the length of the strip being substantially equal to the length of the slot, one edge of the strip being cemented with conductive adhesive to the narrow side of the bar facing the slot so as to lie along and adjacent to a corner of the bar, and the remainder of the width of the strip being wrapped around the bar to approach the corner from the other side, leaving the opposite edge of the strip free; and the shim being inserted between the free edge of the conductive strip and the slot to pull the free edge towards the corner of the bar on the bottom of the slot.

2. In an electric machine in accordance with claim 1 the further improvement comprising:

conductive adhesive disposed between the wrapping and the side of the bar opposite the side adjacent to the shim.

3. In an electric machine in accordance with one of claim 1 and claim 2, the further improvement comprising:

the conductive adhesive being arranged on subsections of the bar.

* * * * *